United States Patent
Kato et al.

(10) Patent No.: US 8,777,407 B2
(45) Date of Patent: *Jul. 15, 2014

(54) PROGRESSIVE-POWER LENS AND PROGRESSIVE-POWER LENS DESIGN METHOD

(75) Inventors: Kazutoshi Kato, Minamiminowa-mura (JP); Yohei Suzuki, Minamiminowa-mura (JP)

(73) Assignee: Hoya Lens Manufacturing Philippines Inc., Cavite (PH)

( * ) Notice: Subject to any disclaimer, the term of this patent is extended or adjusted under 35 U.S.C. 154(b) by 43 days.

This patent is subject to a terminal disclaimer.

(21) Appl. No.: 13/403,895

(22) Filed: Feb. 23, 2012

(65) Prior Publication Data

US 2012/0218510 A1 Aug. 30, 2012

(30) Foreign Application Priority Data

Feb. 24, 2011 (JP) ................................. 2011-037962

(51) Int. Cl.
*G02C 7/06* (2006.01)
*G02C 7/02* (2006.01)

(52) U.S. Cl.
CPC ............... *G02C 7/068* (2013.01); *G02C 7/027* (2013.01); *G02C 2202/08* (2013.01)
USPC ................................ 351/159.42; 351/159.74

(58) Field of Classification Search
USPC ........................................ 351/159.41–159.43
See application file for complete search history.

(56) References Cited

U.S. PATENT DOCUMENTS

| | | | |
|---|---|---|---|
| 5,210,553 A | 5/1993 | Barth et al. | |
| 5,926,250 A | 7/1999 | Mukaiyama et al. | 351/168 |
| 6,019,470 A | 2/2000 | Mukaiyama et al. | 351/169 |
| 6,231,184 B1 * | 5/2001 | Menezes et al. | 351/159.42 |
| 2008/0218689 A1 | 9/2008 | Blum et al. | |
| 2009/0326693 A1 | 12/2009 | Yanari | |
| 2010/0060851 A1 | 3/2010 | Allione | |

FOREIGN PATENT DOCUMENTS

| | | |
|---|---|---|
| DE | 102009053467 A1 | 7/2010 |
| EP | 2045649 A1 | 4/2009 |
| FR | 2908191 A1 | 5/2008 |
| WO | WO 97/19382 | 5/1997 |

OTHER PUBLICATIONS

Extended European search report dated Feb. 25, 2013 issued in corresponding European application 12156484.3 cites the U.S. patent.

* cited by examiner

*Primary Examiner* — Ricky Mack
*Assistant Examiner* — Robert E Tallman
(74) *Attorney, Agent, or Firm* — DLA Piper LLP (US)

(57) ABSTRACT

A progressive-power lens includes an eyeball-side surface including a distance portion and a near portion having different values of dioptric power. An intermediate portion connects the distance portion and the near portion to each other. An object-side surface of the progressive-power lens includes a first region extending along a principal meridian and having a spherical shape having first curvature, a second region facing the distance portion and having a spherical shape having second curvature equal to the first curvature, and a third region located outside the first region and below the second region and having third curvature greater than the first curvature.

7 Claims, 18 Drawing Sheets

| DISTANCE FROM PRINCIPAL MERIDIAN IN HORIZONTAL DIRECTION (mm) | 0.0 | 3.0 | 8.0 | 12.0 | 20.0 | 30.0 |
|---|---|---|---|---|---|---|
| POWER (D) | 4.0 | 4.0 | 4.5 | 5.0 | 5.5 | 5.5 |
| CURVATURE (1/m) | 6.042 | 6.042 | 6.798 | 7.553 | 8.308 | 8.308 |
| RADIUS OF CURVATURE (mm) | 165.500 | 165.500 | 147.111 | 132.400 | 120.364 | 120.364 |

| POWER | -30 | -25 | -20 | -15 | -10 | -5 | 0 | 5 | 10 | 15 | 20 | 25 | 30 |
|---|---|---|---|---|---|---|---|---|---|---|---|---|---|
| 30 | 4 | 4 | 4 | 4 | 4 | 4 | 4 | 4 | 4 | 4 | 4 | 4 | 4 |
| 25 | 4 | 4 | 4 | 4 | 4 | 4 | 4 | 4 | 4 | 4 | 4 | 4 | 4 |
| 20 | 4 | 4 | 4 | 4 | 4 | 4 | 4 | 4 | 4 | 4 | 4 | 4 | 4 |
| 15 | 4 | 4 | 4 | 4 | 4 | 4 | 4 | 4 | 4 | 4 | 4 | 4 | 4 |
| 10 | 4 | 4 | 4 | 4 | 4 | 4 | 4 | 4 | 4 | 4 | 4 | 4 | 4 |
| 5 | 4 | 4 | 4 | 4 | 4 | 4 | 4 | 4 | 4 | 4 | 4 | 4 | 4 |
| 0 | 4 | 4 | 4 | 4 | 4 | 4 | 4 | 4 | 4 | 4 | 4 | 4 | 4 |
| -5 | 4.5 | 4.5 | 4.5 | 4.4 | 4.2 | 4.06 | 4 | 4.06 | 4.2 | 4.4 | 4.5 | 4.5 | 4.5 |
| -10 | 5 | 5 | 5 | 4.8 | 4.4 | 4.12 | 4 | 4.12 | 4.4 | 4.8 | 5 | 5 | 5 |
| -15 | 5.5 | 5.5 | 5.5 | 5.2 | 4.7 | 4.2 | 4 | 4.2 | 4.7 | 5.2 | 5.5 | 5.5 | 5.5 |
| -20 | 5.5 | 5.5 | 5.5 | 5.2 | 4.7 | 4.2 | 4 | 4.2 | 4.7 | 5.2 | 5.5 | 5.5 | 5.5 |
| -25 | 5.5 | 5.5 | 5.5 | 5.2 | 4.7 | 4.2 | 4 | 4.2 | 4.7 | 5.2 | 5.5 | 5.5 | 5.5 |
| -30 | 5.5 | 5.5 | 5.5 | 5.2 | 4.7 | 4.2 | 4 | 4.2 | 4.7 | 5.2 | 5.5 | 5.5 | 5.5 |

| CURVA-TURE | -30 | -25 | -20 | -15 | -10 | -5 | 0 | 5 | 10 | 15 | 20 | 25 | 30 (1/m) |
|---|---|---|---|---|---|---|---|---|---|---|---|---|---|
| 30 | 6.042296 | 6.042296 | 6.042296 | 6.042296 | 6.042296 | 6.042296 | 6.042296 | 6.042296 | 6.042296 | 6.042296 | 6.042296 | 6.042296 | 6.042296 |
| 25 | 6.042296 | 6.042296 | 6.042296 | 6.042296 | 6.042296 | 6.042296 | 6.042296 | 6.042296 | 6.042296 | 6.042296 | 6.042296 | 6.042296 | 6.042296 |
| 20 | 6.042296 | 6.042296 | 6.042296 | 6.042296 | 6.042296 | 6.042296 | 6.042296 | 6.042296 | 6.042296 | 6.042296 | 6.042296 | 6.042296 | 6.042296 |
| 15 | 6.042296 | 6.042296 | 6.042296 | 6.042296 | 6.042296 | 6.042296 | 6.042296 | 6.042296 | 6.042296 | 6.042296 | 6.042296 | 6.042296 | 6.042296 |
| 10 | 6.042296 | 6.042296 | 6.042296 | 6.042296 | 6.042296 | 6.042296 | 6.042296 | 6.042296 | 6.042296 | 6.042296 | 6.042296 | 6.042296 | 6.042296 |
| 5 | 6.042296 | 6.042296 | 6.042296 | 6.042296 | 6.042296 | 6.042296 | 6.042296 | 6.042296 | 6.042296 | 6.042296 | 6.042296 | 6.042296 | 6.042296 |
| 0 | 6.042296 | 6.042296 | 6.042296 | 6.042296 | 6.042296 | 6.042296 | 6.042296 | 6.042296 | 6.042296 | 6.042296 | 6.042296 | 6.042296 | 6.042296 |
| -5 | 6.797583 | 6.797583 | 6.797583 | 6.646526 | 6.344411 | 6.132931 | 6.042296 | 6.132931 | 6.344411 | 6.646526 | 6.797583 | 6.797583 | 6.797583 |
| -10 | 7.55287 | 7.55287 | 7.55287 | 7.250755 | 6.646526 | 6.223565 | 6.042296 | 6.223565 | 6.646526 | 7.250755 | 7.55287 | 7.55287 | 7.55287 |
| -15 | 8.308157 | 8.308157 | 8.308157 | 7.854985 | 7.099698 | 6.344411 | 6.042296 | 6.344411 | 7.099698 | 7.854985 | 8.308157 | 8.308157 | 8.308157 |
| -20 | 8.308157 | 8.308157 | 8.308157 | 7.854985 | 7.099698 | 6.344411 | 6.042296 | 6.344411 | 7.099698 | 7.854985 | 8.308157 | 8.308157 | 8.308157 |
| -25 | 8.308157 | 8.308157 | 8.308157 | 7.854985 | 7.099698 | 6.344411 | 6.042296 | 6.344411 | 7.099698 | 7.854985 | 8.308157 | 8.308157 | 8.308157 |
| -30 | 8.308157 | 8.308157 | 8.308157 | 7.854985 | 7.099698 | 6.344411 | 6.042296 | 6.344411 | 7.099698 | 7.854985 | 8.308157 | 8.308157 | 8.308157 |

FIG. 9

| RADIUS OF CURVATURE | -30 | -25 | -20 | -15 | -10 | -5 | 0 | 5 | 10 | 15 | 20 | 25 | 30 (mm) |
|---|---|---|---|---|---|---|---|---|---|---|---|---|---|
| 30 | 165.5 | 165.5 | 165.5 | 165.5 | 165.5 | 165.5 | 165.5 | 165.5 | 165.5 | 165.5 | 165.5 | 165.5 | 165.5 |
| 25 | 165.5 | 165.5 | 165.5 | 165.5 | 165.5 | 165.5 | 165.5 | 165.5 | 165.5 | 165.5 | 165.5 | 165.5 | 165.5 |
| 20 | 165.5 | 165.5 | 165.5 | 165.5 | 165.5 | 165.5 | 165.5 | 165.5 | 165.5 | 165.5 | 165.5 | 165.5 | 165.5 |
| 15 | 165.5 | 165.5 | 165.5 | 165.5 | 165.5 | 165.5 | 165.5 | 165.5 | 165.5 | 165.5 | 165.5 | 165.5 | 165.5 |
| 10 | 165.5 | 165.5 | 165.5 | 165.5 | 165.5 | 165.5 | 165.5 | 165.5 | 165.5 | 165.5 | 165.5 | 165.5 | 165.5 |
| 5 | 165.5 | 165.5 | 165.5 | 165.5 | 165.5 | 165.5 | 165.5 | 165.5 | 165.5 | 165.5 | 165.5 | 165.5 | 165.5 |
| 0 | 165.5 | 165.5 | 165.5 | 165.5 | 165.5 | 165.5 | 165.5 | 165.5 | 165.5 | 165.5 | 165.5 | 165.5 | 165.5 |
| -5 | 147.1111 | 147.1111 | 147.1111 | 150.4545 | 157.619 | 163.0542 | 165.5 | 163.0542 | 157.619 | 150.4545 | 147.1111 | 147.1111 | 147.1111 |
| -10 | 132.4 | 132.4 | 132.4 | 137.9167 | 150.4545 | 160.6796 | 165.5 | 160.6796 | 150.4545 | 137.9167 | 132.4 | 132.4 | 132.4 |
| -15 | 120.3636 | 120.3636 | 120.3636 | 127.3077 | 140.8511 | 157.619 | 165.5 | 157.619 | 140.8511 | 127.3077 | 120.3636 | 120.3636 | 120.3636 |
| -20 | 120.3636 | 120.3636 | 120.3636 | 127.3077 | 140.8511 | 157.619 | 165.5 | 157.619 | 140.8511 | 127.3077 | 120.3636 | 120.3636 | 120.3636 |
| -25 | 120.3636 | 120.3636 | 120.3636 | 127.3077 | 140.8511 | 157.619 | 165.5 | 157.619 | 140.8511 | 127.3077 | 120.3636 | 120.3636 | 120.3636 |
| -30 | 120.3636 | 120.3636 | 120.3636 | 127.3077 | 140.8511 | 157.619 | 165.5 | 157.619 | 140.8511 | 127.3077 | 120.3636 | 120.3636 | 120.3636 |

| y COORDINATE (mm) \ x COORDINATE (mm) | -36 | -32 | -28 | -24 | -20 | -16 | -12 | -8 | -4 | 0 | 4 | 8 | 12 | 16 | 20 | 24 | 28 | 32 | 36 |
|---|---|---|---|---|---|---|---|---|---|---|---|---|---|---|---|---|---|---|---|
| 36 | | | | | | | | | | | | | | | | | | | |
| 32 | | | | | | | | | | | | | | | | | | | |
| 28 | | | | | | | 1.0027051 | 0.9967898 | 0.9955727 | 0.9954775 | 0.9955615 | 0.9984075 | | | | | | | |
| 24 | | | | 1.0078431 | 1.0057723 | 1.0033714 | 1.0028894 | 0.9977146 | 0.9964928 | 0.9956049 | 0.9964672 | 0.9974564 | 0.9994617 | 1.0020924 | | | | | |
| 20 | | | 1.0095955 | 1.0074680 | 1.0055123 | 1.0036494 | 1.0012668 | 0.9995945 | 0.9974014 | 0.9964049 | 0.9964617 | 0.9973611 | 0.9983660 | 1.0004022 | 1.0028700 | | | | |
| 16 | | | 1.0083788 | 1.0077903 | 1.0051109 | 1.0038082 | 1.0013739 | 0.9983603 | 0.9982773 | 0.9973057 | 0.9973611 | 0.9983660 | 0.9983660 | 1.0004022 | 1.0028700 | 1.0077082 | | | |
| 12 | 1.0094239 | 1.0165939 | 1.0103545 | 1.0081294 | 1.0068235 | 1.0032725 | 1.0013739 | 0.9988325 | 0.9982773 | 0.9981680 | 0.9982552 | 0.9991787 | 0.9991102 | 1.0032285 | 1.0058197 | 1.0075296 | 1.0082867 | | |
| 8 | 1.0218376 | 1.0196863 | 1.0187896 | 1.0105545 | 1.0092729 | 1.0092729 | 1.0024447 | 0.9996325 | 0.9990682 | 0.9981680 | 0.9982552 | 0.9991787 | 0.9991102 | 1.0032285 | 1.0057814 | 1.0077031 | 1.0084374 | | |
| 4 | 1.0391014 | 1.0313196 | 1.0238964 | 1.0268239 | 1.0208235 | 1.0140934 | 1.0092516 | 0.9994218 | 0.9996682 | 0.9996147 | 0.9995811 | 1.0000819 | 1.0011920 | 1.0007017 | 1.0044185 | 1.0075801 | 1.0087774 | 1.0099579 | 1.0084710 |
| 0 | 1.0461969 | 1.0461327 | 1.0291124 | 1.0291124 | 1.0290633 | 1.0128590 | 1.0067265 | 1.0035453 | 1.0025439 | 0.9995811 | 1.0008771 | 1.0008771 | 1.0033329 | 1.0071187 | 1.0120249 | 1.0154467 | 1.0179861 | 1.0191645 | |
| -4 | 1.0772924 | 1.0613196 | 1.0491327 | 1.0391124 | 1.0299533 | 1.0221850 | 1.0197709 | 1.0039416 | 1.0013721 | 1.0001680 | 1.0006363 | 1.0033115 | 1.0088449 | 1.0131394 | 1.0185454 | 1.0245827 | 1.0290667 | 1.0243352 | 1.0404908 |
| 4 | 1.0867725 | 1.0884289 | 1.0542286 | 1.0445089 | 1.0342316 | 1.0269305 | 1.0198852 | 1.0152278 | 1.0047845 | 1.0010979 | 1.0010979 | 1.0049366 | 1.0088460 | 1.0199577 | 1.0270217 | 1.0356781 | 1.0448039 | 1.0546617 | 1.0701589 |
| -8 | 1.0918760 | 1.0736710 | 1.0602735 | 1.0499623 | 1.0393204 | 1.0318317 | 1.0198852 | 1.0152278 | 1.0128947 | 1.0048383 | 1.0048383 | 1.0204454 | 1.0164635 | 1.0260674 | 1.0326638 | 1.0405540 | 1.0498792 | 1.0592365 | 1.0785821 |
| -12 | 1.0835777 | 1.0571634 | 1.0617334 | 1.0460735 | 1.0397464 | 1.0351893 | 1.0262991 | 1.0271099 | 1.0152278 | 1.0225602 | 1.0225602 | 1.0275565 | 1.0264191 | 1.0315250 | 1.0385809 | 1.0458559 | 1.0532606 | 1.0626260 | 1.0805887 |
| -16 | | 1.0423975 | 1.0416212 | 1.0460735 | 1.0388985 | 1.0351893 | 1.0240575 | 1.0434784 | 1.0152278 | 1.0225602 | 1.0275565 | 1.0274861 | 1.0274861 | 1.0353276 | 1.0359082 | 1.0434463 | 1.0468309 | 1.0454453 | 1.0498176 |
| -16 | | 1.0423975 | 1.0416212 | 1.0397464 | 1.0388985 | 1.0387079 | 1.0425971 | 1.0434784 | 1.0458472 | 1.0468259 | 1.0459917 | 1.0390124 | 1.0390124 | 1.0362363 | 1.0365022 | 1.0396845 | 1.0394918 | 1.0460550 | |
| -20 | | 1.0221390 | 1.0317619 | 1.0365782 | 1.0372516 | 1.0413745 | 1.0532806 | 1.0595603 | 1.0468472 | 1.0468259 | 1.0601011 | 1.0616682 | 1.0472836 | 1.0420335 | 1.0387598 | 1.0331455 | 1.0327308 | 1.0239106 | |
| -24 | | | 1.0270679 | 1.0317619 | 1.0365782 | 1.0462226 | 1.0530730 | 1.0737789 | 1.0737789 | 1.0722462 | 1.0814809 | 1.0616682 | 1.0776252 | 1.0544143 | 1.0387598 | 1.0422694 | 1.0391276 | 1.0357592 | |
| -28 | | | 1.0069959 | 1.0363219 | 1.0429698 | 1.0523928 | 1.0630730 | 1.0875635 | 1.0808889 | 1.0814809 | 1.0949662 | 1.0832173 | 1.0382866 | 1.0346060 | 1.0458650 | 1.0459994 | 1.0357969 | | |
| -32 | | | | 1.0056842 | 1.0054131 | 1.0595716 | 1.0793299 | 1.0875635 | 1.0916838 | 1.0987186 | 1.0987186 | 1.0832173 | 1.0459994 | 1.0422694 | 1.0432237 | 1.0336795 | | | |
| -32 | | | | | 1.0382619 | 1.0429698 | 1.0714928 | 1.0876305 | 1.0808889 | 1.0987186 | 1.0987186 | 1.0832173 | 1.0459994 | 1.0515908 | 1.0901111 | 1.0335842 | | | |
| -36 | | | | | | 1.0062143 | 1.0498651 | 1.0238671 | 1.1131843 | 1.1108078 | 1.0892173 | 1.0884445 | 1.0616682 | 1.0932061 | | | | | |
| -36 | | | | | | | 1.0049203 | 1.0048245 | 1.0048837 | 1.0048278 | 1.0049202 | 1.0048837 | 1.0049776 | | | | | | |

PROGRESSIVE-POWER LENS AND PROGRESSIVE-POWER LENS DESIGN METHOD

CROSS-REFERENCE TO RELATED APPLICATIONS

This application claims priority to Japanese Patent Application No. 2011-037962, filed on Feb. 24, 2011, the entirety of which is hereby incorporated by reference.

BACKGROUND

1. Technical Field

The present invention relates to a progressive-power lens and a progressive-power lens design method.

2. Related Art

International Publication WO97/19382 describes a progressive multifocal lens used as a spectacle lens suitable for presbyopia correction or other vision correction and having a progressive-power surface provided on the eyeball-side surface instead of the object-side surface as in related art. This configuration allows the object-side surface to be a spherical surface having a fixed base curve, whereby no variation in magnification caused by the shape factor will occur, and the difference in magnification between the distance portion and the near portion can be reduced. In addition, any change in magnification of the progression portion can be suppressed. As a result, the amount of image shaking and distortion due to the difference in magnification can be reduced, whereby a progressive multifocal lens that provides a comfortable field of view can be provided. International Publication WO97/19382 also describes that a combination method allows a progressive-power surface and a toric surface for astigmatism correction to be combined on the eyeball-side surface to reduce the amounts of image shaking and distortion in a progressive multifocal lens for astigmatism correction.

Although the technology described in International. Publication WO97/19382 and other technologies have improved the performance of a progressive-power lens, some users still cannot adapt to the characteristics of a progressive-power lens, particularly the image shaking phenomenon, and further improvement is therefore desired.

SUMMARY

An aspect of the invention is directed to a progressive-power lens including an eyeball-side surface which includes a distance portion and a near portion having different values of dioptric power and an intermediate portion that connects the distance portion and the near portion to each other. An object-side surface of the progressive-power lens includes a first region extending along a principal meridian and having a spherical shape having first curvature, a second region facing the distance portion and having a spherical shape having second curvature equal to the first curvature, and a third region located outside the first region and below the second region and having third curvature greater than the first curvature.

In what is called an inner-surface progressive lens in which the eyeball-side surface (inner surface) includes a distance portion, a near portion, and an intermediate portion, the object-side surface (outer surface) can be a spherical surface having fixed curvature, that is, fixed surface power. In such an inner-surface progressive lens, the difference in magnification among images formed through the distance portion, the intermediate portion, and the near portion can be reduced, and hence shaking of an image formed through the progressive-power lens can be reduced. On the other hand, in a progressive-power lens, in general, the power abruptly decreases on both sides of the intermediate and near portions. When the line of sight is moved in the horizontal direction (right-left direction) from or to the intermediate or near portion, the magnification at which an image formed through the progressive-power lens tends to greatly vary, and hence a wearer (user) senses image shaking or feels uncomfortable in some cases. Specifically, when the line of sight is moved in a rightward or leftward direction (from principal meridian outward in horizontal direction), the magnification at which an image formed through the progressive-power lens decreases.

In the progressive-power lens, to reduce the decrease in magnification at which an image is formed due to the decrease in power, the surface power of the object-side surface is increased by setting the third curvature of the third region of the object-side surface, which is located outside the first region and below the second region, that is, the region outside the intermediate and near portions rightward and leftward (outside in horizontal direction), to be greater than the first and second curvature of the spherical first and second regions. As a result, the degree of image shaking produced when the line of sight is moved in the horizontal direction can be reduced, whereby a spectacle progressive-power lens that reduces discomfort that the wearer feels can be provided.

In the progressive-power lens, it is preferable that the third region has an aspherical shape, and that the third curvature increases with distance from the principal meridian outward in a horizontal direction (rightward and leftward). The power (dioptric power) of the eyeball-side progressive surface decreases with distance from the intermediate and near portions outward in the horizontal direction. Image shaking produced when the line of sight is moved in the horizontal direction can therefore be further reduced by increasing the third curvature of the object-side surface rightward and leftward (outward in horizontal direction), that is, increasing the surface power of the object-side surface rightward and leftward.

It is preferable that the third curvature of the third region monotonously increases with distance from the principal meridian outward in the horizontal direction. A surface having the third curvature that changes monotonously with distance outward in the horizontal direction can be manufactured relatively readily and economically. Further, a surface having the third curvature that changes monotonously with distance outward in the horizontal direction sufficiently reduces the change in Magnification due to the change in power (dioptric power) of the progressive surface. As a result, progressive-power lens that includes an object-side surface having a simple configuration and reduces the amount of image shaking can be provided.

A width W of the first region of the progressive-power lens measured on both sides of the principal meridian preferably satisfies the following condition.

$$6 \leq W \leq 14 \quad (1)$$

where the unit of the width W is millimeters

In a typical progressive-power lens, the near portion is inset by a value ranging from 2 to 3 mm. In view of this fact, when the width W of the first region measured on both sides of the principal meridian is 6 mm, that is, when a fixed-curvature region having a width of ±3 mm with respect to the principal meridian is provided, the intermediate portion (progressive portion) is accommodated in the fixed-curvature region, whereby the viewing area of the intermediate portion, which has the narrowest viewing area, can be ensured. On the other hand, the near portion of a current progressive-power lens is inset by 5 mm at the maximum, which is practically the greatest value necessary for an object distance of 15 cm. When the center of the near portion is inset by 5 mm, another fixed viewing area of 2 mm may be ensured by increasing the width W of the first region measured on both sides of the principal meridian to 14 mm, that is, by providing a fixed-curvature region having a width of ±7 mm with respect to the principal meridian.

Another aspect of the invention is directed to spectacles including the progressive-power lenses described above and a spectacle frame to which the progressive-power lenses are attached.

Still another aspect of the invention is directed to a progressive-power lens design method. The design method includes designing an eyeball-side surface based on spectacle specifications, the eyeball-side surface including a distance portion and a near portion having different values of dioptric power and an intermediate portion that connects the distance portion and the near portion to each other. The design method further includes designing an object-side surface including a first region extending along a principal meridian and having a spherical shape having first curvature, a second region facing the distance portion and having a spherical shape having second curvature equal to the first curvature, and a third region located outside the first region and below the second region and having third curvature greater than the first curvature.

In intermediate vision in which an image is acquired through the intermediate portion and in near vision in which an image is acquired through the near portion using a progressive-power lens designed by the method, when the line of sight is moved in the horizontal direction, the difference in magnification at which the image is formed can be reduced and hence image shaking can be suppressed. In particular, a spectacle progressive-power lens that reduces discomfort that a wearer who frequently uses near vision feels can be provided.

In the design method, the designing of the object-side surface is preferably so performed that the third curvature of the aspheric third region increases with distance from the principal meridian rightward and leftward (outward in horizontal direction). In this way, a progressive-power lens that further reduces the amount of image shaking can be provided.

In the design method, the designing of the object-side surface is also effectively so performed that the first curvature of the first region, the second curvature of the second region, and the third curvature of the third region of the object-side surface have common values irrespective of the spectacle specifications.

A progressive-power lens having large addition dioptric power specified in spectacle specifications suffers from a large difference in magnification between the near portion and the regions on both sides thereof. In view of this fact, the first, second, and third curvatures may be determined based on the spectacle specifications. On the other hand, the difference in magnification at which an image is formed and hence the degree of image shaking can be reduced by setting the first and second curvatures to be a fixed value and the third curvature to be a greater value than the fixed value irrespective of addition dioptric power, as described above. As a result, semi-finished design in which a common object-side surface is used can be employed by using common first, second, and third curvature irrespective of spectacle specifications, whereby the manufacturing cost can be reduced.

In the design method, the designing of the object-side surface may be so performed that the first curvature of the first region, the second curvature of the second region, and the third curvature of the third region of the object-side surface have common values when addition dioptric power specified in the spectacle specifications falls within a predetermined range. A semi-finished design in which a common object-side surface is used can be employed when the addition dioptric power specified in the spectacle specifications falls within a predetermined range, whereby the manufacturing cost can be reduced.

Yet another aspect of the invention is directed to a progressive-power lens manufacture method including manufacturing a progressive-power lens designed based on the design method described above.

BRIEF DESCRIPTION OF THE DRAWINGS

The invention will be described with reference to the accompanying drawings, wherein like numbers reference like elements.

FIG. 6 is a table showing the distributions of the power, curvature, and radius of curvature of the outer surface versus the distance from a principal meridian (y coordinate in the horizontal direction).

FIG. 7 is a table showing the distribution of the power of the outer surface.

FIG. 8 is a table showing the distribution of the curvature of the outer surface.

FIG. 9 is a table showing the distribution of the radius of curvature of the outer surface.

FIG. 10 is a table showing the magnification of the progressive-power lens according to Example 1.

FIG. 11 is a table showing the magnification of a progressive-power lens according to Comparative Example 1.

FIG. 14 is a table showing the magnification of a progressive-power lens according to Example 2.

FIG. 15 is a table showing the magnification of a progressive-power lens according to Comparative Example 2.

FIG. 17 is a table showing the magnification of a progressive-power lens according to Example 3.

FIG. 18 is a table showing the magnification of a progressive-power lens according to Comparative Example 3.

DESCRIPTION OF EXEMPLARY EMBODIMENTS

Figure 1:
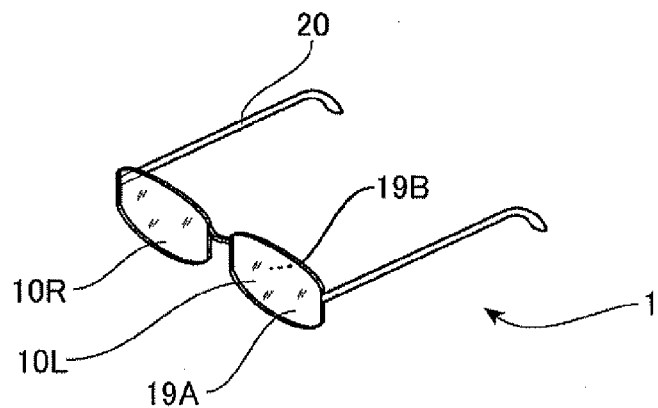
FIG. 1 is a perspective view showing an example of spectacles.
Figures 2A, 2B:
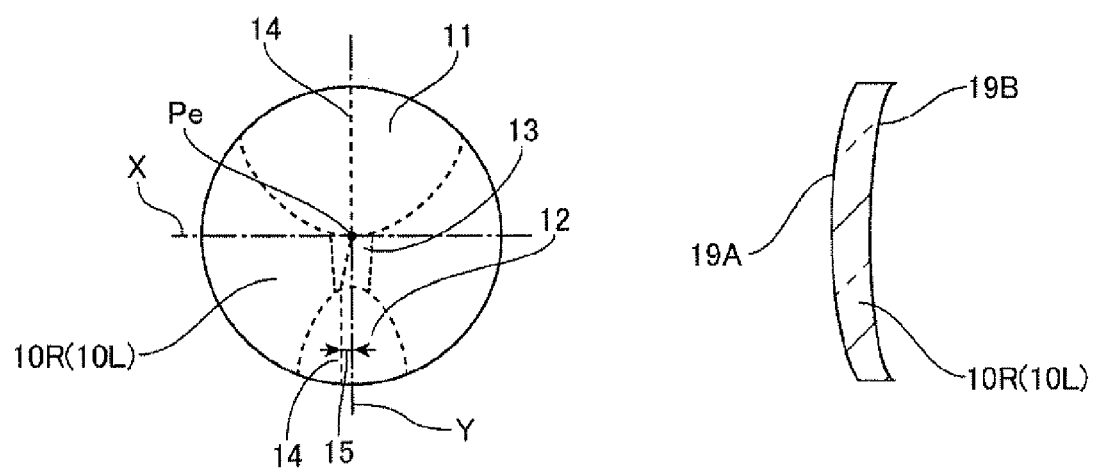
FIG. 2A is a plan view diagrammatically showing a progressive-power lens.
FIG. 2B is a cross-sectional view of the progressive-power lens.

FIG. 1 is a perspective view showing an example of spectacles. FIG. 2A is a plan view diagrammatically showing a progressive-power lens according to an embodiment of the invention. FIG. 2B is a cross-sectional view diagrammatically showing the progressive-power lens.

In the present embodiment, the right and left sides are considered as the right and left sides viewed from a user (wearer, eyeball). Spectacles 1 include a pair of right and left spectacle lenses 10R, 10L for the right and left eyes and a spectacle frame 20 to which the lenses 10R and 10L are attached. Each of the spectacle lenses 10R and 10L is a progressive multifocal lens (progressive-power lens). Each of the lenses 10R and 10L basically has a meniscus shape convex toward an object. Each of the lenses 10R and 10L therefore has an object-side surface (convex surface, hereinafter also referred to as outer surface) 19A and an eyeball-side (user-side) surface (concave surface, hereinafter also referred to as inner surface) 19B.

FIG. 2A shows the lens 10R for the right eye. The lens 10R has a distance portion 11, which is an upper viewing area that allows the wearer to view a distant object (distant vision), and a near portion 12, which is a lower viewing area that allows the wearer to view a near object (near vision) and has dioptric power (power) different from that of the distance portion 11. The lens 10R further has an intermediate portion (portion for intermediate vision, progressive portion, progressive corridor) 13 that connects the distance portion 11 and the near portion 12 to each other in such a way that the power continuously changes across the boundary therebetween. The lens 10R further has a principal line of fixation 14 that connects on-lens positions that are the centers of the viewing areas for distant vision, intermediate vision, and near vision. A fitting point Pe, which is an on-lens reference point through which the line of sight is designed to pass when the spectacle lens 10R is fit in a rim of the frame and the periphery of the rim is so shaped that the lens is fixed therein with the wearer horizontally viewing a distant object in front of the wearer (primary position), is typically positioned in the vicinity of the lower end of the distance portion 11.

In the following description, it is assumed that the fitting point Pe is the origin of the coordinates of the lens, an x coordinate is a horizontal coordinate along a horizontal reference line X passing through the fitting point Pe, and a y coordinate is a vertical coordinate along a vertical reference line (principal meridian) Y passing through the fitting point Pe. The principal line of fixation 14 deviates from the principal meridian Y toward the nose after it passes through the fitting point Pe or a point in the vicinity thereof. The distance 15 between the principal line of fixation 14 and the principal meridian Y is referred to as an inset.

The following description of a spectacle lens (lens) will be made primarily based on the spectacle lens 10R for the right eye. The spectacle lens described herein may be the lens 10L for the left eye, because the spectacle lens 10R for the right eye and the lens 10L for the left eye are basically symmetric with respect to the vertical central line of the spectacles 1 except differences in spectacle specifications between the right and left eyes. In the following description, the spectacle lens 10R for the right eye and the spectacle lens 10L for the left eye are collectively referred to as a spectacle lens (or lens) 10.

Among a variety of optical performance characteristics of the progressive-power lens 10, the size of the field of view can be determined by an astigmatism distribution diagram and a spherical dioptric power equivalent distribution diagram. One of the important performance characteristics of the progressive-power lens 10 is the degree of shaking that the wearer who wears the progressive-power lens 10 senses when the wearer moves the head. It is noted that progressive-power lenses 10 having substantially the same astigmatism distribution and spherical dioptric power equivalent distribution may differ from each other in terms of shaking in some cases.

Figure 3A:
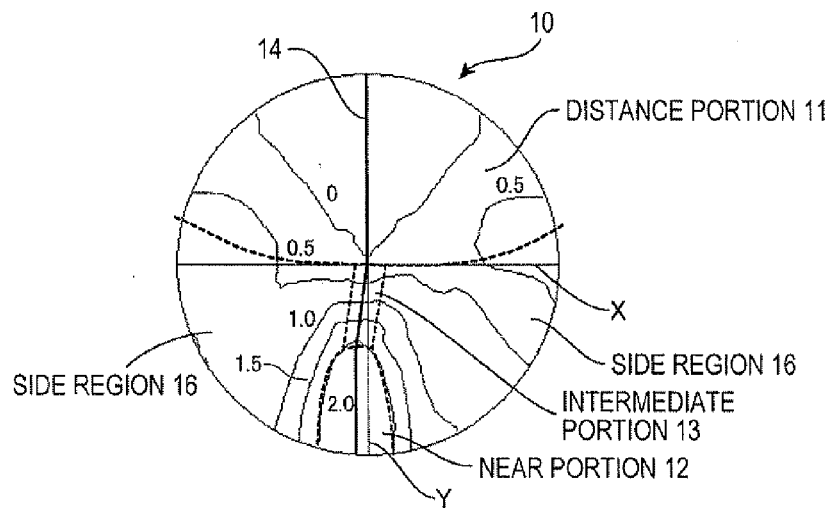
FIG. 3A shows a dioptric power distribution of a spectacle lens.
Figure 3B:
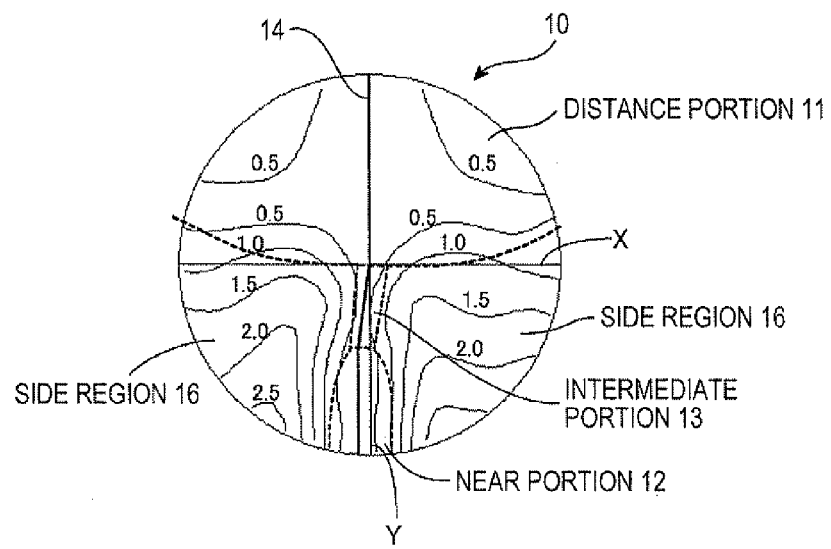
FIG. 3B shows an astigmatism distribution of the spectacle lens.
Figure 3C:
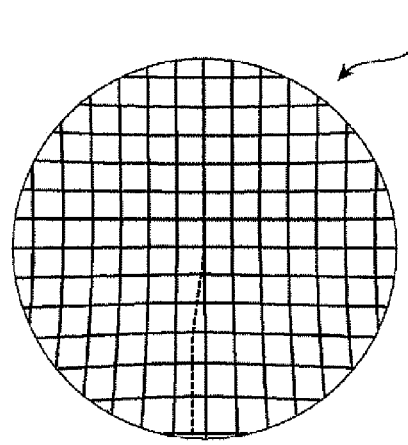
FIG. 3C shows distortion that a wearer senses when viewing a square grid through the spectacle lens.

FIG. 3A shows a dioptric power distribution (power distribution in dioptre (D)) of a typical progressive-power lens 10. FIG. 3B shows an astigmatism distribution (in dioptre (D)). FIG. 3C shows distortion that the wearer senses when viewing a square grid through the lens 10. In the progressive-power lens 10, predetermined dioptric power is added along the principal line of fixation 14. Adding dioptric power causes large astigmatism on both sides of the intermediate region (intermediate portion, progressive region) 13, resulting in a blurred image formed by the light having passed through either of the side regions. In the dioptric power distribution, the dioptric power increases in the near portion 12 by a predetermined amount (addition dioptric power) and gradually decreases through the intermediate portion 13 and the distance portion 11. In the distance portion 11 of the progressive-power lens 10, the dioptric power (distance dioptric power, Sph) is 0.00 D (dioptre), and the addition dioptric power (Add) is 2.00 D.

Due to the difference in dioptric power across the lens 10, the near portion 12, where the dioptric power is larger, forms a more magnified image than the distance portion 11, and an image of the square grid formed through portions on both sides of the intermediate portion 13 and the near portion 12 is slightly distorted. Further, the dioptric power (power) abruptly decreases in side regions 16 on the right and left sides of the intermediate portion 13 and the near portion 12 (side regions 16 horizontally outside the intermediate portion 13 and the near portion 12) as shown in FIG. 3A, and hence a less magnified image is formed through each of the side regions 16. The variation in the magnification at which an image is formed causes image shaking when the wearer moves the head rightward or leftward (in horizontal direction).

Figure 4:
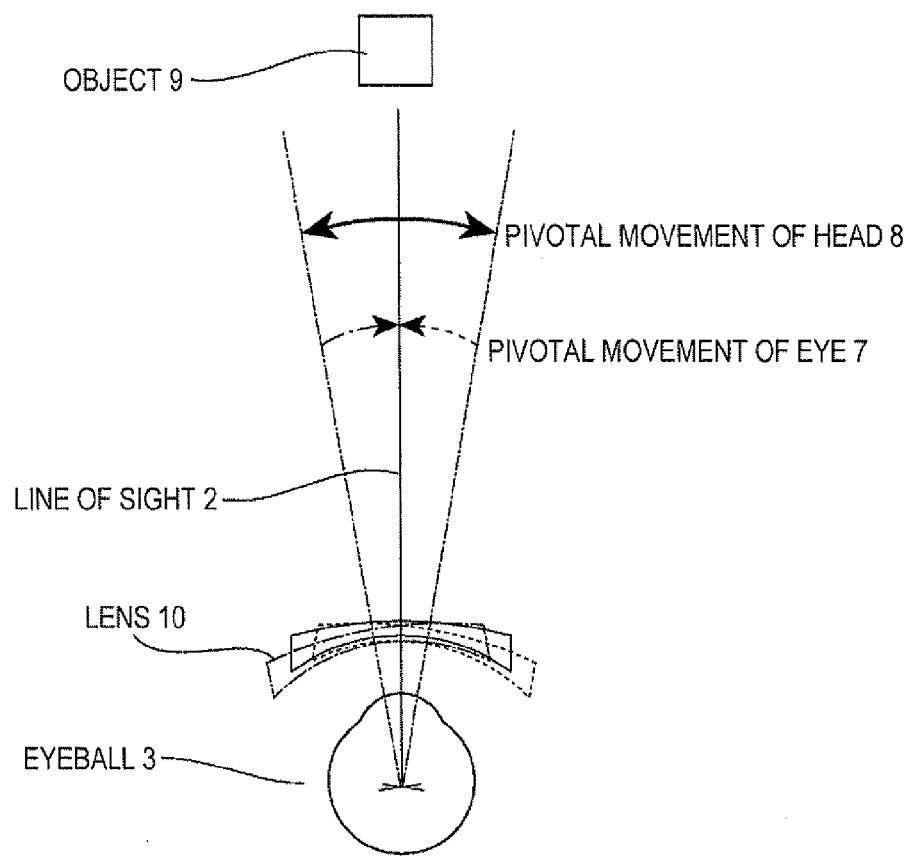
FIG. 4 shows vestibule-ocular reflex.

FIG. 4 schematically shows vestibulo-ocular reflex (VOR). When a person who is looking at an object moves the head, the person's sight also moves. At this point, an image on the retina also moves. When an eyeball 3 moves (pivotal movement (rotation) 7 of eye) to cancel the movement of the head (pivotal movement (rotation) of face, pivotal movement of head) 8, the line of sight 2 is fixed (does not move), whereby the image on the retina does not move. Such reflex eyeball movement that fixes an image on the retina is called compensatory eye movement. Vestibulo-ocular reflex is one type of the compensatory eye movement, and pivotal movement of the head triggers the reflex action. A neural mechanism of the vestibulo-ocular reflex triggered by horizontal rotation (horizontal pivotal movement) of the head has been explained to some extent as follows: It is believed that the pivotal movement 8 of the head is sensed by the horizontal semicircular canal, which inhibits or excites the external ocular muscle, which then moves the eyeball 3.

When the head makes a pivotal movement and vestibulo-ocular reflex produces a pivotal movement of the eyeball, an image on the retina does not move but the spectacle lens 10 makes a pivotal movement together with that of the head, as indicated by the broken line and the dashed line in FIG. 4. In this process, the vestibulo-ocular reflex causes the line of sight 2 passing through the spectacle lens 10 to move relative to the spectacle lens 10. The image on the retina therefore shakes in some cases when imaging performance of the spectacle lens 10 varies within the range over which the vestibulo-ocular reflex causes the eyeball 3 to move, that is, the range over which the line of sight 2 moves due to the vestibulo-ocular reflex.

The magnification M of a spectacle lens approximates to the following expression $$M = Ms \times Mp \quad (2)$$

In Expression (2), Ms represents a shape factor, and Mp represents a power factor. Now, let n be the refractive index of the material of the lens, D (dioptre) be the base curve (surface power) of the object-side surface of the lens, L be the distance from the vertex of the eyeball-side surface of the lens (inner vertex) to the eyeball, P (dioptric power S) be the power at the inner vertex (inner vertex power), and t be the central thickness of the lens, and Mp and Ms are expressed as follows.

$$Ms = 1/(1 - D \times t/n) \quad (3)$$

$$Mp = 1/(1 - L \times P) \quad (4)$$

To evaluate Expressions (3) and (4), the base curve D and the inner vertex power P are measured in dioptre (D), and the thickness t and the distance L are measured in meters (m).

Expression (2) is therefore rewritten as follows.

$$M = \{1/(1 - D \times t/n)\} \times \{1/(1 - L \times P)\} \quad (5)$$

Expression (5) shows that the magnification M decreases as the power P decreases, which means that the magnification M at which an image is formed through either of the side regions 16 is smaller than the magnification at which an image is formed through the intermediate portion 13 and the magnification at which an image is formed through the near portion 12. On the other hand, the magnification M can be increased by increasing the base curve D, that is, the surface power of the outer surface 19A.

In view of the fact described above, in Examples described below, an inner-surface progressive lens is employed, and the change in magnification at which an image is formed through either of the side regions 16 and hence the amount of image shaking is reduced by increasing the surface power of the portions of the outer surface 19A that face the side regions 16 located outside the intermediate portion 13 and the near portion 12 of the inner surface 19B.

2. EXAMPLES

2.1 Example 1

A progressive-power lens 10a according to Example 1 was designed based on an inner-surface progressive-power lens "Seiko Super P-1" type A (refractive index: 1.67) manufactured by Seiko Epson Corp. to which the following spectacle specifications are applied: the length of the progressive corridor is 14 mm; the prescribed dioptric power (distance dioptric power, Sph) is 0.00 D; and the addition dioptric power (Add) is 1.00 (D). Further, the diameter of the lens 10a is 65 mm, and no astigmatism dioptric power is considered. The progressive-power lens 10a therefore has a progressive inner surface 19B including the distance portion 11, the near portion 12, the intermediate portion 13, and the side regions 16 shown in FIG. 3A.

Figure 5:
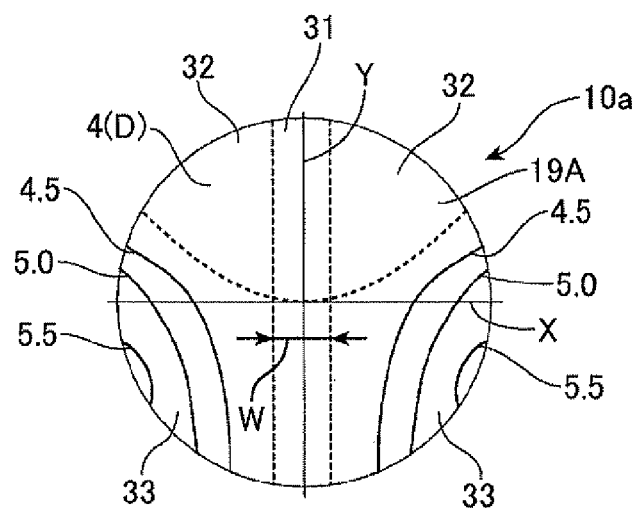
FIG. 5 shows the distribution of the surface power of an outer surface of a progressive-power lens according to Example 1.

FIG. 5 shows the distribution of the surface power of the outer surface 19A of the progressive-power lens 10a according to Example 1. FIG. 6 is a table showing the distributions of the power, curvature, and radius of curvature of the outer surface 19A versus the distance from the principal meridian Y (y coordinate in the horizontal direction). FIG. 7 is a table showing the distribution of the power of the outer surface 19A in the form of coordinate matrix (x, y). FIG. 8 is a table showing the distribution of the curvature of the outer surface 19A in the form of coordinate matrix (x,y). FIG. 9 is a table showing the distribution of the radius of curvature of the outer surface 19A in the form of coordinate matrix (x,y).

The outer surface 19A is basically a spherical surface having a surface power of 4.00 (D) and has aspherical regions on both sides thereof. In the aspherical regions, the surface power monotonously increases gradually toward the periphery. That is, the object-side surface (outer surface) 19A has a first region 31 extending along the principal meridian Y and having a spherical shape having first curvature r1 (first surface power D1), a second region 32 facing (corresponding to) the distance portion 11 and having a spherical shape having second curvature r2 (second surface power D2), which is equal to the first curvature r1, and a third region 33 located outside the first region 31 and below the second region 32 and having third curvature r3 (third surface power D3), which is greater than the first curvature r1. The third region 33 is, in practice, the region of the outer surface 19A that is outside the intermediate portion 13 and the near portion 12 of the inner surface 19B in the horizontal direction, that is, the region that faces (corresponds to) the side regions 16.

In the progressive-power lens 10a according to Example 1, the first curvature r1 and the second curvature r2 are 6.042 (1/m), and the first surface power D1 and the second surface power D2 are 4.0 (D). The third curvature r3, which is greater than the first curvature r1, gradually increases from the value of 6.042 (1/m) at the boundary between the first region 31 and the third region 33 with distance from the boundary outward in the horizontal direction and reaches 8.308 (1/m) in the vicinity of the periphery (edge). Where the surface power is concerned, the third surface power D3 is greater than the first surface power D1, gradually increases from the value of 4.0 (D) at the boundary between the first region 31 and the third region 33 with distance from the boundary outward in the horizontal direction, and reaches 5.5 (D) in the vicinity of the periphery (edge). In other words, the first region 31 and the second region 32 are formed of a spherical surface, and the third region 33 is formed of an aspherical surface.

In the progressive-power lens 10a according to the present example, the third curvature r3 of the third region 33 monotonously increases with distance from the principal meridian Y outward in the horizontal direction. In FIG. 5, the isoquant curves representing the third surface power D3 corresponding to the third curvature r3 of the third region 33 are spaced substantially uniformly.

The width W of the first region 31 measured on both sides of the principal meridian Y is 8 mm (distance from principal meridian Y (y coordinate) is ±4 mm), which satisfies the condition (1) described above. In a typical progressive-power lens 10 (most progressive-power lenses 10), the inset of the near portion 12, that is, the distance 15 between the principal line of fixation 14 in the near portion 12 and the principal meridian Y, ranges from 2 to 3 mm. In view of this fact, when the width W of the first region 31 measured on both sides of the principal meridian Y is 6 mm, that is, when a fixed-curvature region having a width of ±3 mm with respect to the principal meridian Y is provided, the intermediate portion (progressive portion) 13 is accommodated in the fixed-curvature region, whereby the viewing area of the intermediate portion 13, which has the narrowest viewing area, can be ensured.

On the other hand, the near portion 12 of a current progressive-power lens 10 is inset by 5 mm at the maximum, which is practically the greatest value necessary for an object distance of 15 cm. When the center of the near portion is inset by 5 mm, another fixed viewing area of 2 mm may be ensured by increasing the width W of the first region 31 measured on both sides of the principal meridian Y to 14 mm, that is, by providing a fixed-curvature region having a width of ±7 mm with respect to the principal meridian Y.

When the width W of the first region 31 is close to the upper limit of the condition (1), that is, when the outer surface (convex surface) 19A has a fixed-curvature region having a width of ±7 mm measured on both sides of the principal meridian Y, the inner surface (concave surface) 19B may be configured based on basic progressive design. On the other hand, when the width W of the first region 31 is close to the lower limit of the condition (1), that is, when the outer surface (convex surface) 19A has a fixed-curvature region having a width of ±3 mm measured on both sides of the principal meridian Y, the first region 31 alone may not ensure the width of a clear field of the near portion 12 in some cases. In this case, the viewing area of the near portion 12 can be ensured by correcting the progressive design of the inner surface (concave surface) 19B. For example, it is conceivable to add an aspherical element whose curvature is distributed in the horizontal direction in accordance with the change in curvature of the outer surface 19A to the inner surface 19B.

2.2 Comparative Example 1

A progressive-power lens 10b was designed as Comparative Example 1 and compared with the progressive-power lens 10a according to Example 1. The progressive-power lens 10b has a spherical outer surface 19A having a surface power of 4.0 (D) and the same inner surface 19B as that of the progressive-power lens 10a.

2.3 Comparison

Figure 10:
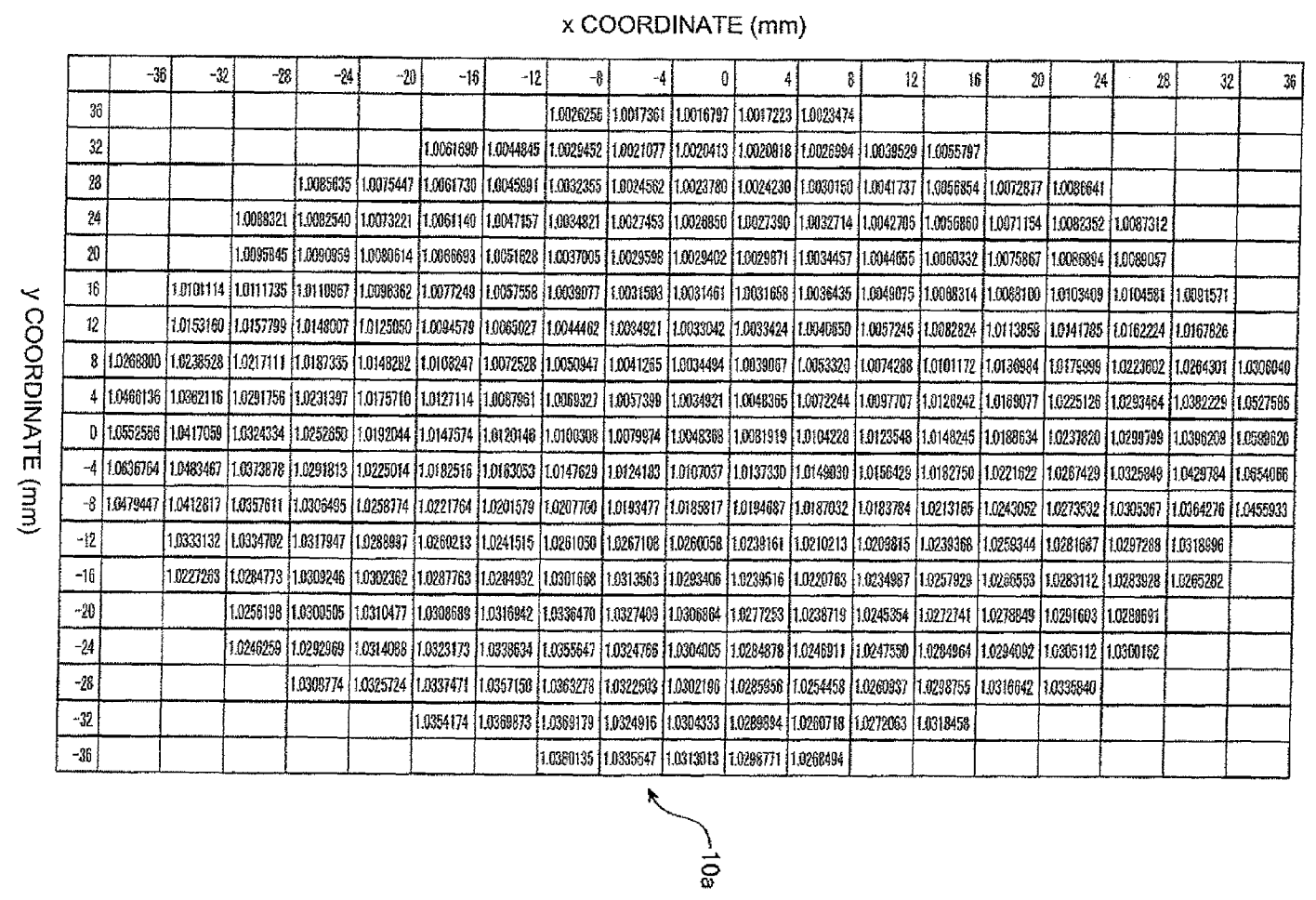
Figure 11:
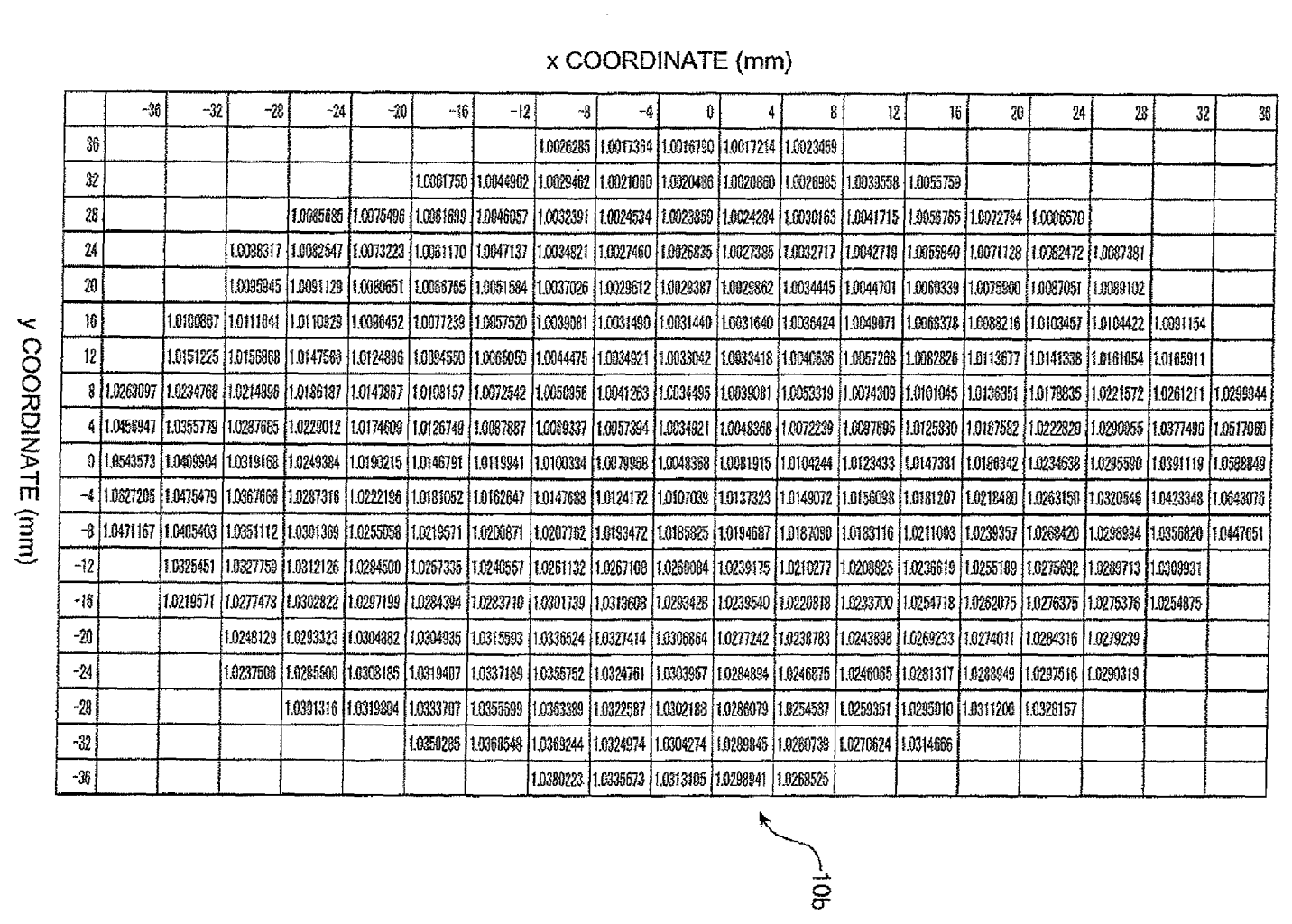
Figure 12:
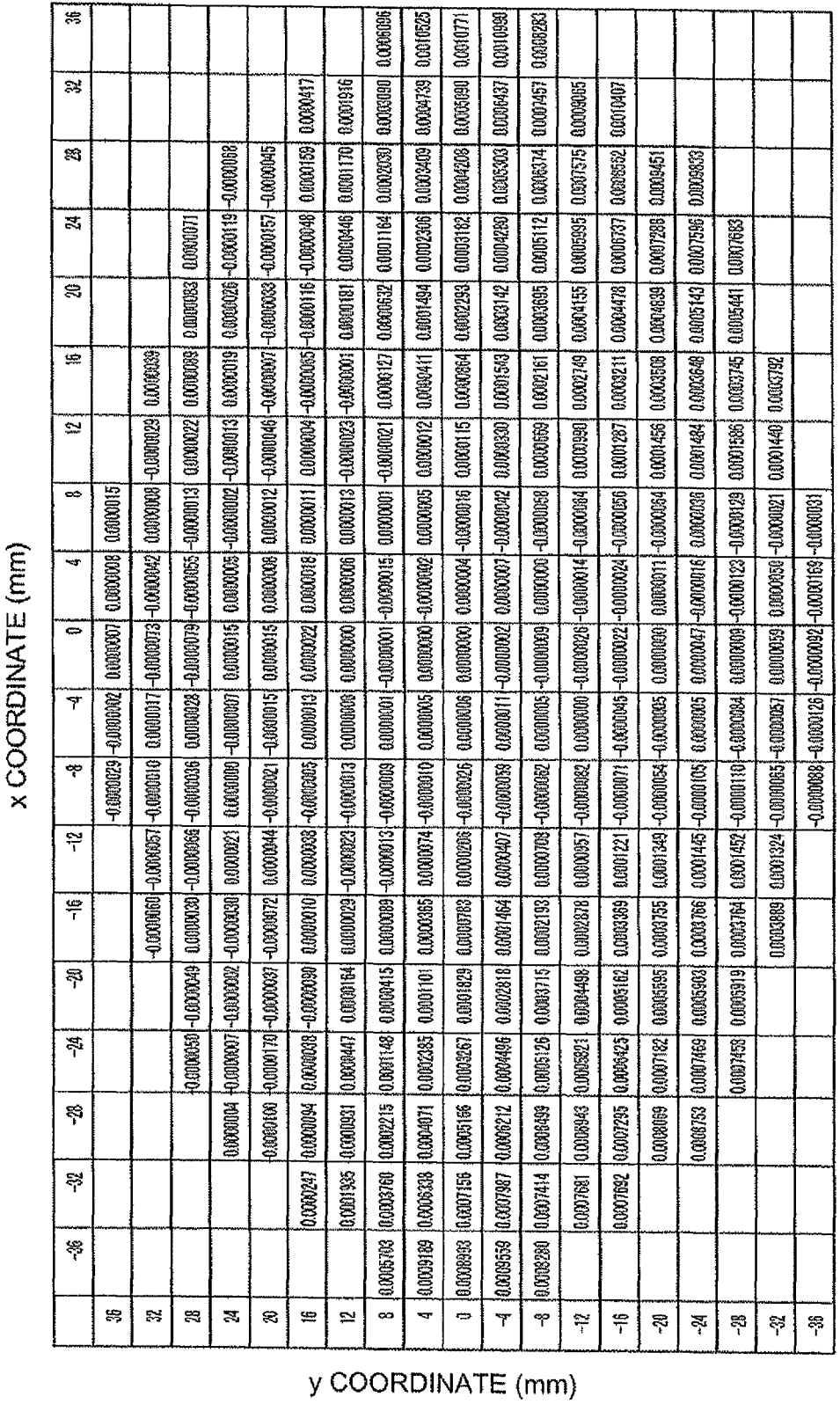
FIG. 12 is a table showing the ratio of the magnification of the progressive-power lens according to Example 1 to the magnification of the progressive-power lens according to Comparative Example 1.

FIG. 10 is a table showing the magnification at which an image is formed through the progressive-power lens 10a according to Example 1 in the form of coordinate matrix (x,y). FIG. 11 is a table showing the magnification at which an image is formed through the progressive-power lens 10b according to Comparative Example 1 in the form of coordinate matrix (x,y). FIG. 12 is a table showing the ratio of the magnification of the progressive-power lens 10a according to Example 1 to the magnification of the progressive-power lens 10b according to Comparative Example 1 in the form of coordinate matrix (x,y).

For example, look at the magnification at a y coordinate of −24 mm, which is close to the boundary between the intermediate portion 13 and the near portion 12, in the progressive-power lens 10b according to Comparative Example 1 shown in FIG. 11. The magnification is 1.0303957 at an x coordinate of 0 mm, which is on the principal meridian Y, and 1.0237506 at an x coordinate of −28 mm, which is apart sideways. Therefore, an image formed through an outer region is smaller than an image formed through a region along the principal meridian Y, and the ratio of the magnification at which an image is formed through the outer region to the magnification at which an image is formed through the region along the principal meridian Y is about 99.36%.

On the other hand, look at the magnification at a y coordinate of −24 mm in the progressive-power lens 10a according to Example 1 shown in FIG. 10. The magnification is 1.0304005 at an x coordinate of 0 mm and 1.0246259 at an x coordinate of −28 mm, which is apart sideways. Therefore, an image formed through the outer third region 33 is still smaller than an image formed through the first region 31 along the principal meridian Y, but the magnification in the outer third region 33 is greater than the corresponding value in Comparative Example 1 and the magnification ratio is about 99.44%. In other words, the ratio of the magnification at which an image is formed through either of (right and left) outer regions in the horizontal direction to the magnification at which an image is formed through a region in the vicinity of the principal meridian Y is improved by about 0.08, whereby the degree of image shaking produced when the line of sight 2 is moved in the horizontal direction from or to the near portion 12 or the intermediate portion 13 can be reduced.

In the progressive-power lens 10a according to Example 1, the magnification is greater substantially across the side regions 16 outside the intermediate portion 13 and the near portion 12 than that in the progressive-power lens 10b according to Comparative Example 1, whereby the difference in magnification between an image formed through a region in the vicinity of the principal meridian Y and an image formed through a region apart in the horizontal direction from the principal meridian Y is reduced, as shown FIG. 12.

Further, in a region close to the principal meridian Y, there are portions where the magnification of the progressive-power lens 10a according to Example 1 is smaller than the magnification of the progressive-power lens 10b according to Comparative Example 1, that is, the relationship between the progressive-power lenses 10a and 10b in terms of magnification in the central region is opposite to that in the outer region. This fact also reduces the difference in magnification between an image formed through a region in the vicinity of the principal meridian Y and an image formed through a region apart in the horizontal direction from the principal meridian Y in the progressive-power lens 10a according to Example 1.

Figure 13:
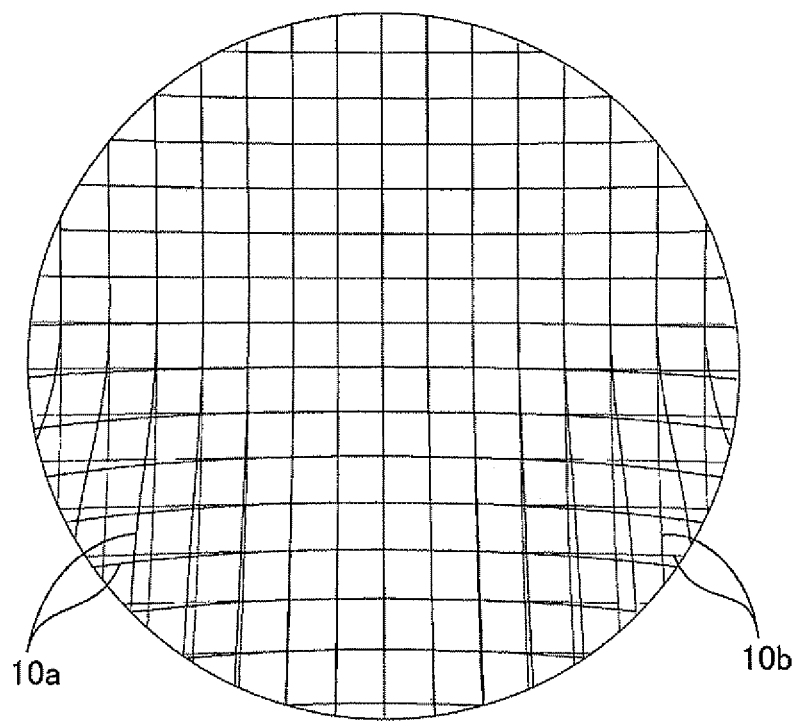
FIG. 13 shows distortion of the square grid viewed through the progressive-power lens according to Example 1 and the progressive-power lens according to Comparative Example 1.

FIG. 13 shows distortion of the square grid viewed through the progressive-power lens 10a according to Example 1 and the progressive-power lens 10b according to Comparative Example 1. In the progressive-power lens 10b according to Comparative Example 1, since the magnification decreases on both sides of the intermediate portion 13 and the near portion 12, the resultant image becomes smaller. In contrast, in the progressive-power lens 10a according to Example 1, since the decrease in magnification on both sides of the intermediate portion 13 and the near portion 12 is smaller, the change in size of the resultant image is small. The spectacles 1 using the progressive-power lens 10a allow a user who frequently looks at an object through the intermediate portion 13 and the near portion 12, particularly a user who frequently looks at an object through the near portion 12, for example, a user whose job is assembling precise parts, to look at an object with less image shaking resulting from horizontal movement of the line of sight 2 and hence provide excellent viewing performance.

2.4 Example 2 and Comparative Example 2

A progressive-power lens 10c according to Example 2 was designed based on the inner-surface progressive-power lens "Seiko Super P-1" type A (refractive index: 1.67) manufactured by Seiko Epson Corp. to which the following spectacle specifications are applied: the length of the progressive corridor is 14 mm; the prescribed dioptric power (distance dioptric power, Sph) is 0.00 D; and the addition dioptric power (Add) is 2.00 (D). The other conditions are the same as those of the progressive-power lens 10a according to Example 1, and the progressive inner surface 19B includes the distance portion 11, the near portion 12, the intermediate portion 13, and the side regions 16. Further, the outer surface 19A is basically a spherical surface having a surface power of 4.00 (D) and has aspherical regions on both sides thereof. In the aspherical regions, the surface power monotonously increases gradually toward the periphery. Specifically, the outer surface 19A is the same as that of the progressive-power lens 10a according to Example 1. That is, the object-side surface (outer surface) 19A has a first region 31 extending along the principal meridian Y and having a spherical shape having first curvature r1 (first surface power D1), a second region 32 facing the distance portion 11 and having a spherical shape having second curvature r2 (second surface power D2), which is equal to the first curvature r1, and a third region 33 located outside the first region 31 and below the second region 32 and having third curvature r3 (third surface power D3), which is greater than the first curvature r1.

A progressive-power lens 10d was designed as Comparative Example 2 and compared with the progressive-power lens 10c according to Example 2. The progressive-power lens 10d has a spherical outer surface 19A having a surface power of 4.0 (D) and the same inner surface 19B as that of the progressive-power lens 10c.

2.5 Comparison

Figure 14:
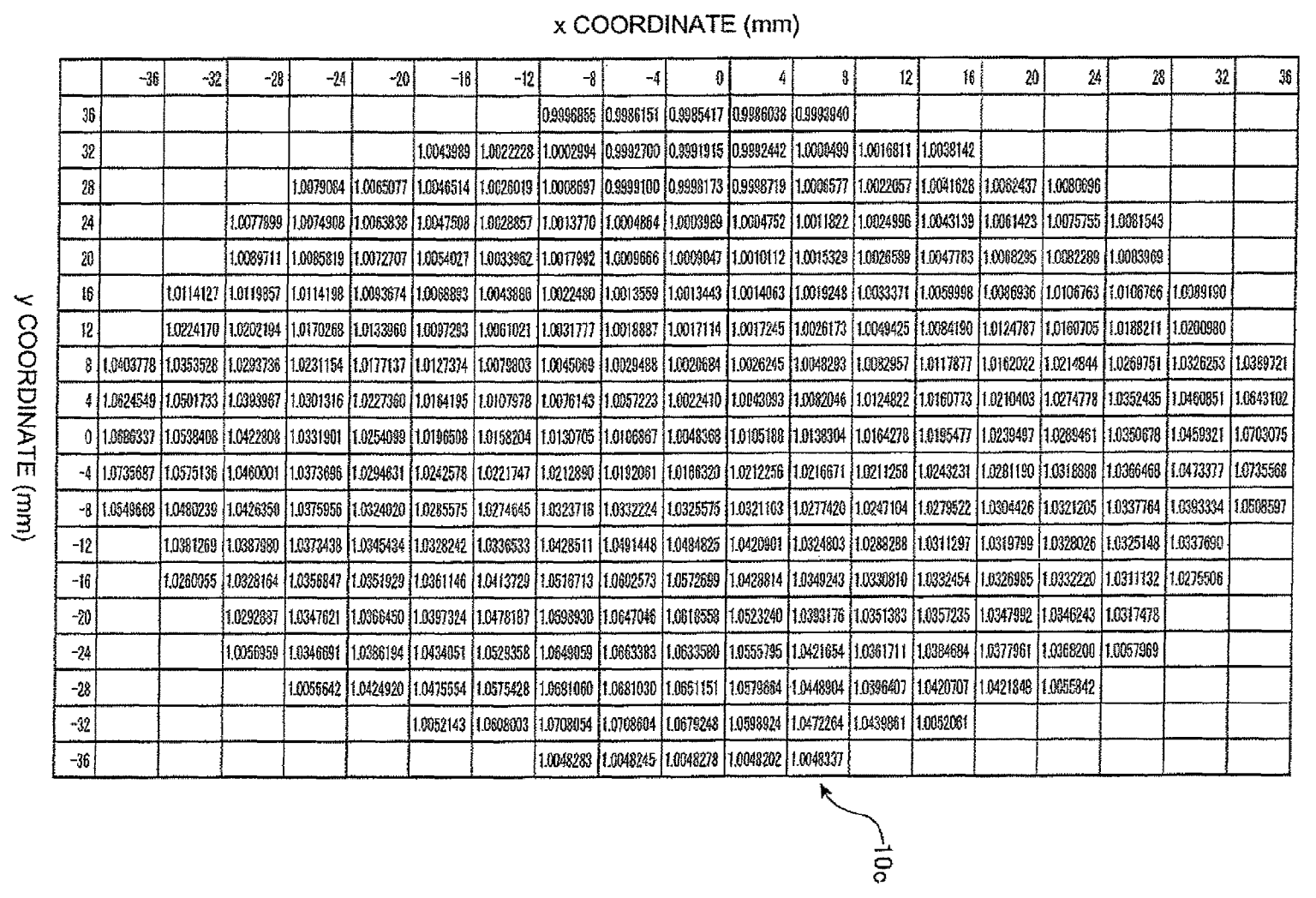
Figure 15:
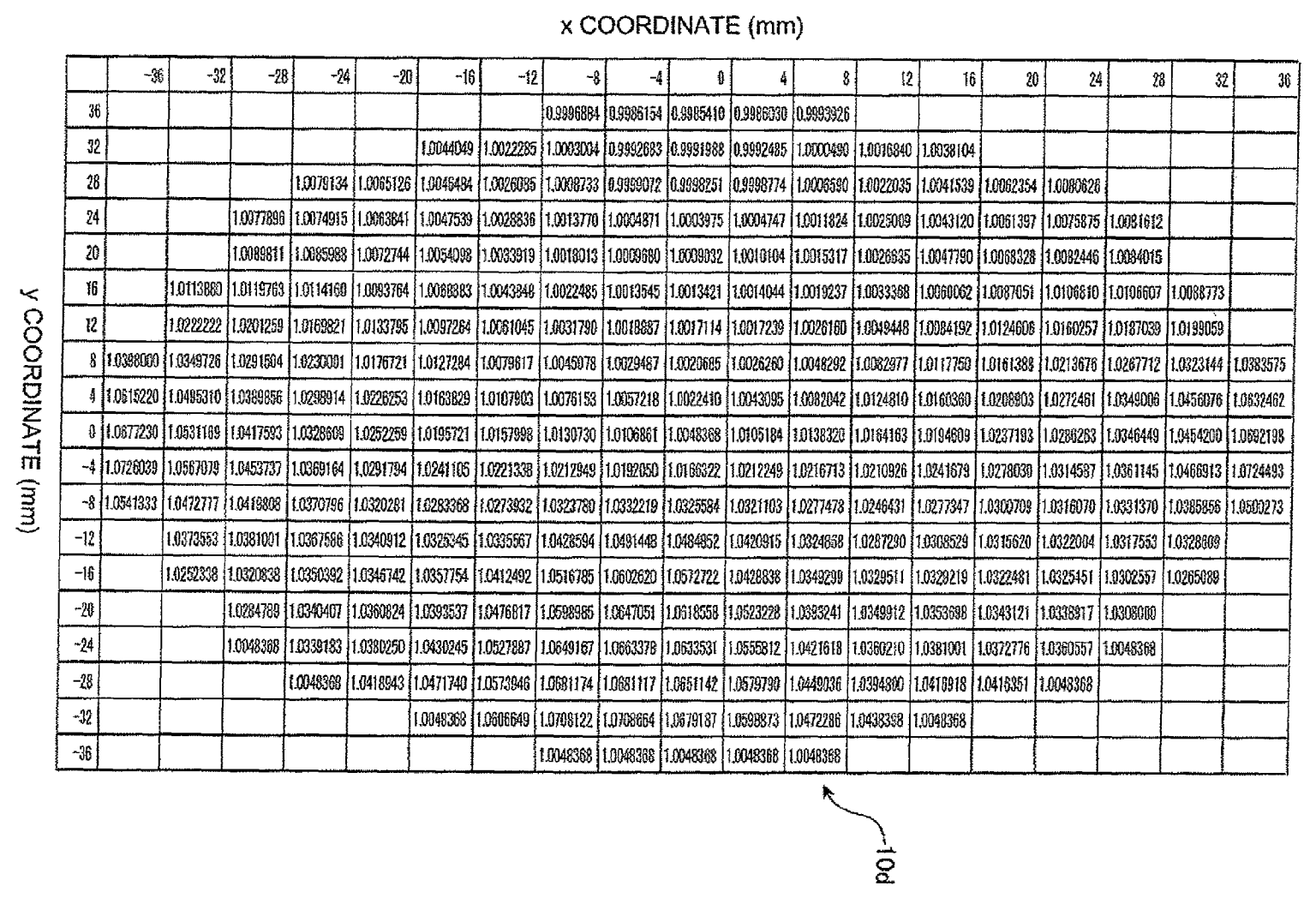
Figure 16:
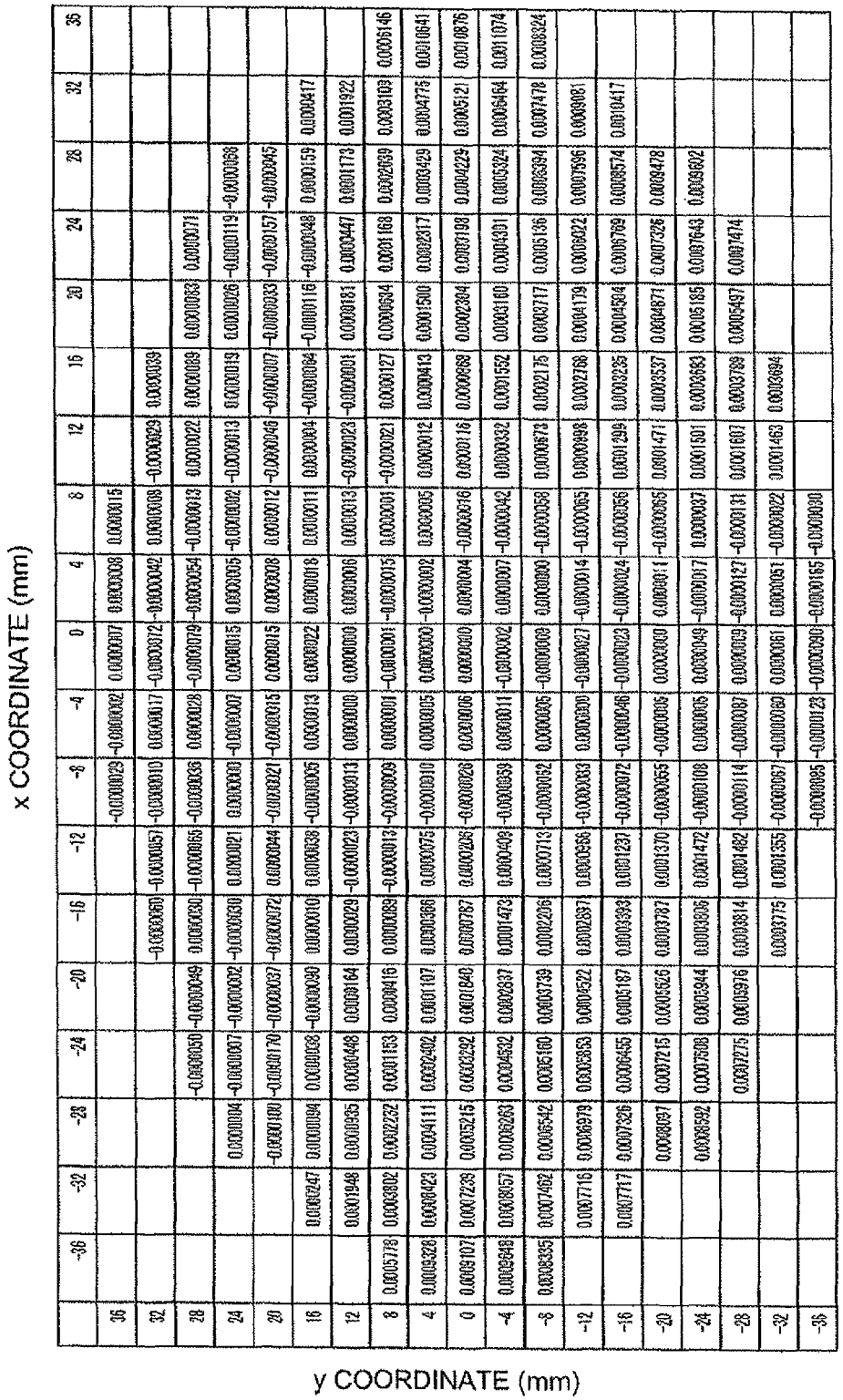
FIG. 16 is a table showing the ratio of the magnification of the progressive-power lens according to Example 2 to the magnification of the progressive-power lens according to Comparative Example 2.

FIG. 14 is a table showing the magnification at which an image is formed through the progressive-power lens 10c according to Example 2 in the form of coordinate matrix (x,y). FIG. 15 is a table showing the magnification at which an image is formed through the progressive-power lens 10d according to Comparative Example 2 in the form of coordinate matrix (x,y). FIG. 16 is a table showing the ratio of the magnification of the progressive-power lens 10c according to Example 2 to the magnification of the progressive-power lens 10d according to Comparative Example 2 in the form of coordinate matrix (x,y).

As in Example 1, look at the magnification at a y coordinate of −24 mm, which is close to the boundary between the intermediate portion 13 and the near portion 12, in the progressive-power lens 10d according to Comparative Example 2 shown in FIG. 15. The magnification is 1.0633531 at an x coordinate of 0 mm, which is on the principal meridian Y, and 1.0048368 at an x coordinate of −28 mm, which is apart sideways. Therefore, an image formed through an outer region is smaller than an image formed through a region along the principal meridian Y, and the ratio of the magnification at which an image is formed through the outer region to the magnification at which an image is formed through the region along the principal meridian Y is about 94.49%.

On the other hand, look at the magnification at a y coordinate of −24 mm in the progressive-power lens 10c according to Example 2 shown in FIG. 14. The magnification is 1.0633580 at an x coordinate of 0 mm and 1.0056959 at an x coordinate of −28 mm, which is apart sideways. Therefore, an image formed through the outer third region 33 is still smaller than an image formed through the first region 31 along the principal meridian Y, but the magnification in the outer third region 33 is greater than the corresponding value in Comparative Example 2 and the magnification ratio is about 94.58%. In other words, the ratio of the magnification at which an image is formed through either of the (right and left) outer regions in the horizontal direction to the magnification at which an image is formed through a region in the vicinity of the principal meridian Y is improved by about 0.09, whereby the degree of image shaking produced when the line of sight 2 is moved in the horizontal direction from or to the near portion 12 or the intermediate portion 13 can be reduced.

Also in the progressive-power lens 10c according to Example 2, the magnification is greater substantially across the side regions 16 outside the intermediate portion 13 and the near portion 12 than that in the progressive-power lens 10d according to Comparative Example 2, whereby the difference in magnification between an image formed through a region in the vicinity of the principal meridian Y and an image formed through a region apart in the horizontal direction from the principal meridian Y is reduced, as shown in FIG. 16.

2.6 Example 3 and Comparative Example 3

A progressive-power lens 10e according to Example 3 was designed based on the inner-surface progressive-power lens "Seiko Super P-1" type A (refractive index: 1.67) manufactured by Seiko Epson Corp. to which the following spectacle specifications are applied: the length of the progressive corridor is 14 mm; the prescribed dioptric power (distance dioptric power, Sph) is 0.00 D; and the addition dioptric power (Add) is 3.00 (D). The other conditions are the same as those of the progressive-power lens 10a according to Example 1, and the progressive inner surface 19B includes the distance portion 11, the near portion 12, the intermediate portion 13, and the side regions 16. Further, the outer surface 19A is basically a spherical surface having a surface power of 4.00 (D) and has aspherical regions on both sides thereof. In the aspherical regions, the surface power monotonously increases gradually toward the periphery. Specifically, the outer surface 19A is the same as that of the progressive-power lens 10a according to Example 1. That is, the object-side surface (outer surface) 19A has a first region 31 extending along the principal meridian Y and having a spherical shape having first curvature r1 (first surface power D1), a second region 32 facing the distance portion 11 and having a spherical shape having second curvature r2 (second surface power D2), which is equal to the first curvature r1, and a third region 33 located outside the first region 31 and below the second region 32 and having third curvature r3 (third surface power D3), which is greater than the first curvature r1.

A progressive-power lens 10f was designed as Comparative Example 3 and compared with the progressive-power lens 10e according to Example 3. The progressive-power lens 10f has a spherical outer surface 19A having a surface power of 4.0 (D) and the same inner surface 19B as that of the progressive-power lens 10e.

2.7 Comparison

Figure 18:
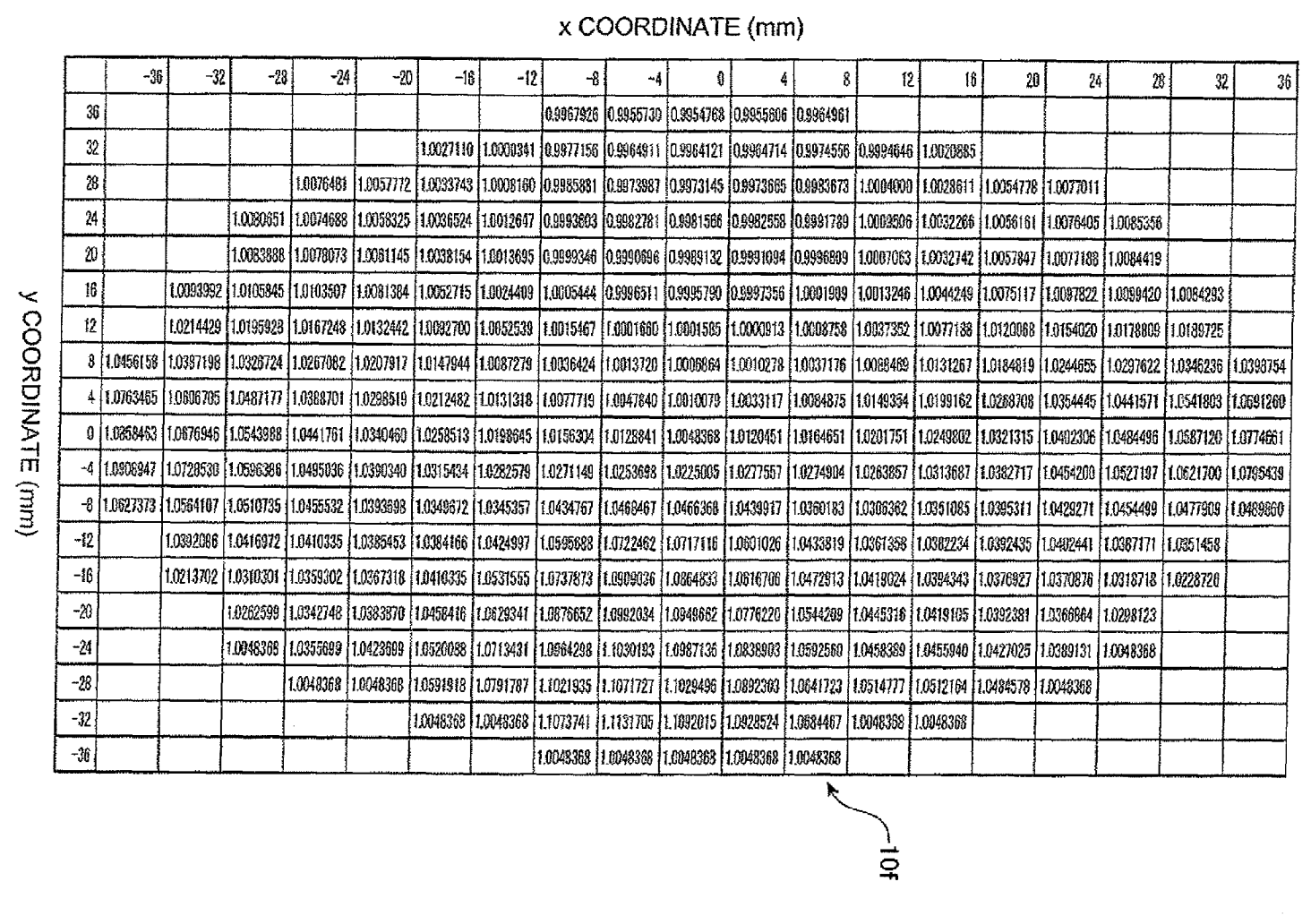
Figure 19:
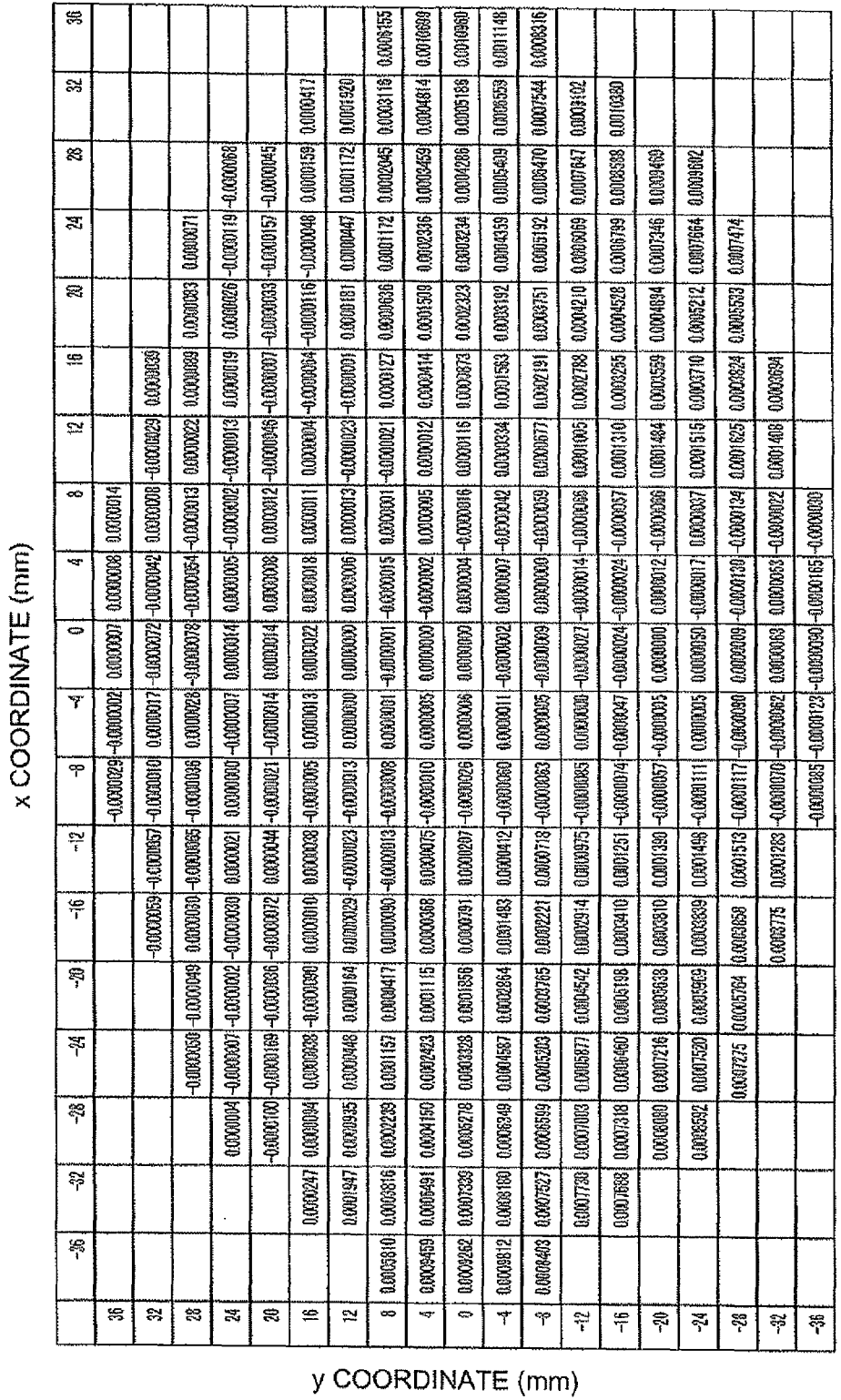
FIG. 19 is a table showing the ratio of the magnification of the progressive-power lens according to Example 3 to the magnification of the progressive-power lens according to Comparative Example 3.

FIG. 17 is a table showing the magnification at which an image is formed through the progressive-power lens 10e according to Example 3 in the form of coordinate matrix (x,y). FIG. 18 is a table showing the magnification at which an image is formed through the progressive-power lens 10f according to Comparative Example 3 in the form of coordinate matrix (x,y). FIG. 19 is a table showing the ratio of the magnification of the progressive-power lens 10e according to Example 3 to the magnification of the progressive-power lens 10f according to Comparative Example 3 in the form of coordinate matrix (x,y).

As in Example 1, look at the magnification at a y coordinate of −24 mm, which is close to the boundary between the intermediate portion 13 and the near portion 12, in the progressive-power lens 10f according to Comparative Example 3 shown in FIG. 18. The magnification is 1.0987136 at an x coordinate of 0 mm, which is on the principal meridian Y, and 1.0048368 at an x coordinate of −28 mm, which is apart sideways. Therefore, an image formed through an outer region is smaller than an image formed through a region along the principal meridian Y, and the ratio of the magnification at which an image is formed through the outer region to the magnification at which an image is formed through the region along the principal meridian Y is about 91.46%.

On the other hand, look at the magnification at a y coordinate of −24 mm in the progressive-power lens 10e according to Example 3 shown in FIG. 17. The magnification is 1.0987186 at an x coordinate of 0 mm and 1.0056959 at an x coordinate of −28 mm, which is apart sideways. Therefore, an image formed through the outer third region 33 is still smaller than an image formed through the first region 31 along the principal meridian Y, but the magnification in the outer third region 33 is greater than the corresponding value in Comparative Example 3 and the magnification ratio is about 91.53%. In other words, the ratio of the magnification at which an image is formed through either of the (right and left) outer regions in the horizontal direction to the magnification at which an image is formed through a region in the vicinity of the principal meridian Y is improved by about 0.07, whereby the degree of image shaking produced when the line of sight 2 is moved in the horizontal direction from or to the near portion 12 or the intermediate portion 13 can be reduced.

Also in the progressive-power lens 10e according to Example 3, the magnification is greater substantially across the side regions 16 outside the intermediate portion 13 and the near portion 12 than that of the progressive-power lens 10f according to Comparative Example 3, whereby the difference in magnification between an image formed through a region in the vicinity of the principal meridian Y and an image formed through a region apart in the horizontal direction from the principal meridian Y is reduced, as shown in FIG. 19.

As described above, in the progressive-power lenses 10a, 10c, and 10e according to Examples 1 to 3, the inner surface 19B is designed based on the addition dioptric power in the spectacle specifications being 1.00 (D), 2.00 (D), and 3.00 (D), respectively. On the other hand, the progressive-power lenses 10a, 10c, and 10e have the common outer surface 19A, which has the spherical first region 31 extending along the principal meridian Y, the spherical second region 32 facing the distance portion 11, and the aspherical third region 33 facing the side regions 16 and having surface power increasing with distance outward from the principal meridian Y. Therefore, even when progressive-power lenses 10 have different spectacle specifications, particularly different addition dioptric power specifications, using the common outer surface 19A suppresses image shaking produced when the line of sight 2 is moved from the principal meridian Y in the horizontal direction. Further, a progressive-power lens having large addition dioptric power suffers from a large difference in magnification between the near portion 12 and the regions on both sides thereof, as described above. In view of this fact, the difference in magnification in the horizontal direction may be further reduced by appropriately setting the addition dioptric power in the spectacle specifications to select the change from the first curvature r1 and the second curvature r2 of the first region 31 and the second region 32 of the outer surface 19A to the third curvature r3 of the third region 33 of the outer surface 19A.

Figure 20:
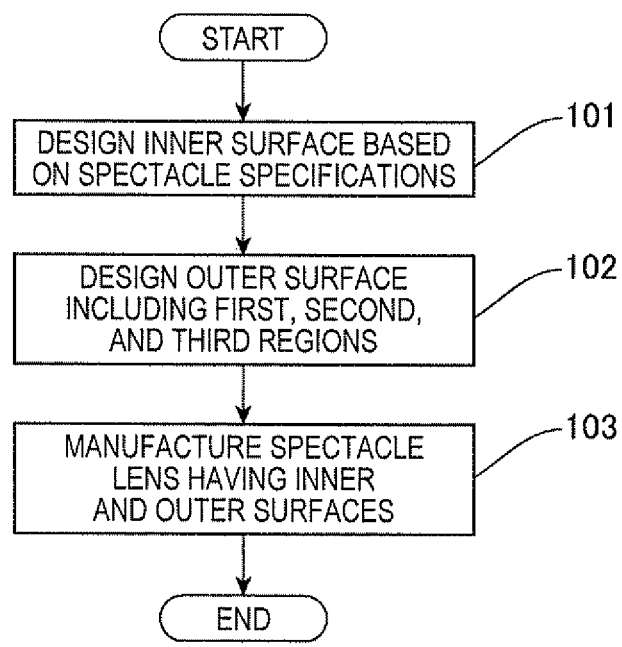
FIG. 20 is a flowchart showing a schematic design/manufacture procedure.

FIG. 20 shows a procedure of designing and manufacturing the progressive power-lens 10. In step 101, the inner surface (eyeball-side surface) 19B is designed based on spectacle specifications. In the progressive-power lens 10, the inner surface 19B is a progressive surface and includes the distance portion 11, the intermediate portion 13, and the near portion 12.

Before or after step 101 or simultaneously therewith, in step 102, the outer surface (object-side surface) 19A including the first region 31, the second region 32, and the third region 33 is designed. In step 102, the outer surface 19A may be a common surface irrespective of the spectacle specifications, that is, may have a common first region 31, a common second region 32, and a common region 33 irrespective of the spectacle specifications. For example, the outer surface 19A may be designed in accordance with a progressive inner surface having an addition dioptric power of 0.5 (D), and then a progressive-power lens having an addition dioptric power of 3.5 (D) may be designed based on the thus designed outer surface (convex surface) 19A. In this case, pre-manufactured, semi-finished lens can be prepared in advance irrespective of the addition dioptric power, which is preferable to reduce the manufacturing cost.

Further, in step 102, when the addition dioptric power specified in the spectacle specifications falls within a predetermined range, the outer surface 19A may be designed to have a first region having common first curvature, a second region having common second curvature, and a third region having common third curvature. For example, three types of outer surface 19A having addition dioptric power of 0.50, 1.00, and 2.50 may be designed in advance, and a progressive-power lens 10 whose addition dioptric power falls within any of the specific ranges may be manufactured by using the corresponding one of the common outer surfaces 19A. In this way, more satisfactory design can be made for predetermined addition dioptric power while the manufacturing cost is kept low.

In the following step 103, a spectacle progressive-power lens 10 having the thus designed inner and outer surfaces is manufactured.

The above description has been made with reference to a progressive-power lens having an outer surface 19A formed of a common curved surface irrespective of spectacle specifications, particularly addition dioptric power specification. Alternatively, the outer surface 19A may be formed of a curved surface having any other shape based on spectacle specifications within those set forth in the appended claims. Further, the above description has been made of the case where the third region 33 is formed of an aspherical surface over which the curvature (surface power) changes. The third region 33 may alternatively be formed of a spherical surface having fixed curvature (surface power).

What is claimed is:

1. A progressive-power lens comprising: an eyeball-side surface including a distance portion and a near portion having different values of dioptric power and an intermediate portion that connects the distance portion and the near portion to each other; and an object-side surface including a first region extending along a principal meridian and having a Spherical shape having a first curvature, a second region corresponding to the distance portion and having a spherical shape having a second curvature equal to the first curvature, and a third region located outside the first region and below the second region and having a third curvature greater than the first and second curvatures, wherein the first curvature of the first region, the second curvature of the second region, and the third curvature of the third region form a set of curvatures common to spectacle specifications having any addition dioptric power range falling within addition dioptric powers of 0.5(D) to 3.5(D).

2. The progressive-power lens according to claim 1, wherein the third region has an aspherical shape, and the third curvature increases with distance from the principal meridian outward in a horizontal direction.

3. The progressive-power lens according to claim 2, wherein the third curvature monotonously increases with distance from the principal meridian outward in the horizontal direction.

4. The progressive-power lens according to claim 1, wherein a width W of the first region measured on both sides of the principal meridian satisfies the following condition:

$$6 \leq W \leq 14$$

where the unit of the width W is millimeters.

5. Spectacles comprising;
the progressive-power lenses according to claim 1; and
a spectacle frame to which the progressive-power lenses are attached.

6. A progressive-power lens design method, the method comprising; designing an eyeball-side surface based on spectacle specifications, the eyeball-side surface including a distance portion and a near portion having different values of dioptric power and an intermediate portion that connects the distance portion and the near portion to each other; and
designing an object-side surface including a first region extending along a principal meridian and having a spherical shape having first curvature, a second region corresponding to the distance portion and having a spherical shape having second curvature equal to the first curvature, and a third region located outside the first region and below the second region and having third curvature greater than the first and second curvatures,
wherein the designing of the object-side surface is performed so that the first curvature of the first region, the second curvature of the second region, and the third curvature of the third region form a set of curvatures common to spectacle specifications having any addition dioptric power range falling within addition dioptric powers of 0.5(D) to 3.5(D).

7. The design method according to claim 6, wherein the designing of the object side surface is so performed that the third curvature of the aspheric third region increases with distance from the principal meridian outward in a horizontal direction.

* * * * *